Aug. 14, 1951  H. OBERTRIFTER  2,564,210
METHOD OF CONSTRUCTING EYE GLASS SHIELDS
Filed Aug. 31, 1948

Herbert Obertrifter
INVENTOR
BY
ATTORNEYS.

Patented Aug. 14, 1951

2,564,210

UNITED STATES PATENT OFFICE 2,564,210

METHOD OF CONSTRUCTING EYEGLASS SHIELDS

Herbert Obertrifter, Elizabeth, N. J.

Application August 31, 1948, Serial No. 47,100

2 Claims. (Cl. 29—20)

This invention relates to a method of constructing securing devices commonly used in securing eye glass temple hinges to eye glass temples constructed of various materials, the securing devices being commonly known to the trade as eye glass shields.

By way of explanation, it might be stated that under known methods of manufacturing eye glass shields, it is customary to solder the studs or pins of the shields to the bodies of the shields, and because of the exceptionally small size of the shield bodies and the studs, the shields frequently become distorted under the soldering heat to render the shields distorted for their purpose, with a resultant loss in material and time, in assembly.

It is therefore the object of the present invention to provide an improved method of manufacturing eye glass shields, and where basis of principle applies, eliminating the necessity of applying heat to secure the studs or pins of the shields to the body portion thereof, and at the same time avoiding any possibility of distorting the shield.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing

Figure 3:
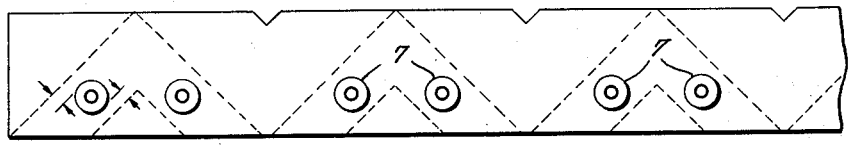
Figure 3 is a plan view of the length of sheet material with the studs or the pins as mounted within the openings formed therein.

Referring to the drawing in detail, in carrying out my method, I provide a length of sheet material indicated generally by the reference character 5, preferably sheet metal which is of a width to permit the bodies of the shields to be readily cut therefrom, points of the shields extending to the longitudinal edges of the sheet material, as shown in dotted lines in Fig. 3 of the drawing.

In Fig. 3 of the drawing, the dotted lines indicate the pattern or design of the shields, and along which lines the sheet material is cut to provide the desired shape for the shields.

Figure 1:
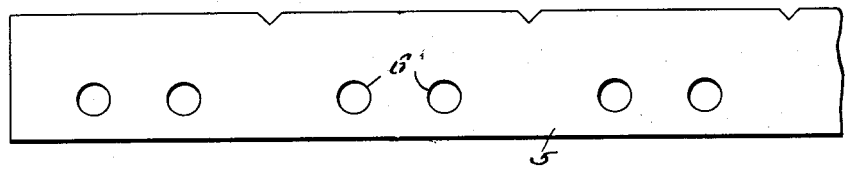
Figure 1 is a plan view of a length of sheet material used in forming eye glass shields.
Figure 2:
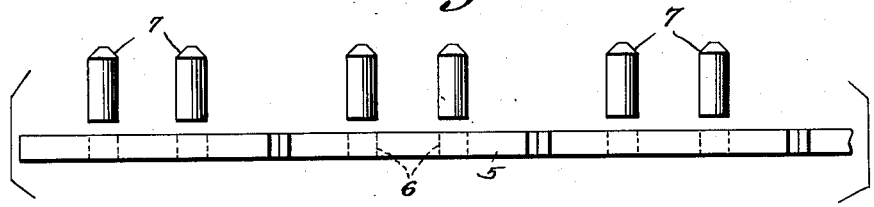
Figure 2 is an edge elevational view thereof showing the pins or studs in positions to be located within the openings of the sheet material of which the body is formed.

Openings 6 are formed in the sheet material, at points within the confines of the design or edges of the shields, as shown by Fig. 1 of the drawing.

The studs or pins which are indicated by the reference character 6 are of diameters only slightly greater than the diameters of the openings so that the pins may be secured within the openings by a press fit. These studs or pins 7 are formed with tapered free ends that guide the studs or pins into the openings of the temple hinge with which the shields are used, in securing the hinges to the temples, the ends of the studs or pins being flattened to secure them within the openings of the hinge. After the securing of the studs or pins 7 within the openings of the sheet material, the sheet material is cut along the dotted lines or design to be formed, cutting the shields from the strip of sheet material completely formed. Studs may be of a plain or serrated finish, choice depending on best grip obtained.

By forming the openings in the sheet material, and pressing the studs or pins into the openings while the material is in strip or sheet form, it will be seen that the sheet metal material will not be distorted during this step of the method with the minimization of waste material in the manufacture of eye glass shields.

Figure 4:
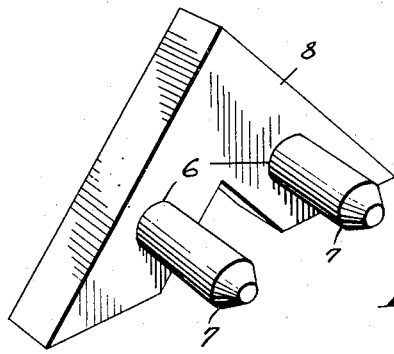
Figure 4 is an illustration of the complete shield.

In Fig. 4 of the drawing a complete shield has been shown and includes the body portion 8. While I have shown a single design in Fig. 4 of the drawing, it is to be understood that the design of the shield may be changed to meet various requirements, without departing from the spirit of the invention.

Having thus described the invention, what is claimed:

1. A method of forming shields used in securing hinges of eye glass temples to eye glass temples, consisting in providing a length of sheet material, outlining the design of the shields on the sheet material, forming openings in the sheet material within the confines of the design formed thereon, providing securing studs of diameters slightly greater than the diameters of said openings, pressing said studs into the openings while the material is in sheet form, securing the pins to the sheet metal by frictional contact with the walls of the openings with one of the respective ends of the studs flush with one surface of the sheet metal material, and finally cutting the sheet material along the edges of the design, forming the body portions of the shields.

2. A method of forming shields used in securing lugs of eye glass temples to eye glass frames, consisting in providing a length of sheet material, outlining the design of the shields to be cut from the material by marking the sheet metal material, forming openings in the sheet material within the confines of the design formed thereon, providing securing studs, securing the studs in the openings by press fitting the studs in said openings, and finally cutting the sheet material along the line forming the design thereon, severing the shields from the sheet material.

HERBERT OBERTRIFTER.

REFERENCES CITED

The following references are of record in the file of this patent:

UNITED STATES PATENTS

| Number | Name | Date |
| --- | --- | --- |
| 658,598 | Stevens et al. | Sept. 25, 1900 |
| 2,300,785 | Haydon | Nov. 3, 1942 |